(12) United States Patent
Yori

(10) Patent No.: US 7,251,908 B2
(45) Date of Patent: Aug. 7, 2007

(54) MAGNETIC DISK DRIVE TO ALLEVIATE DAMAGE FROM THERMAL ASPERITY

(75) Inventor: Takeo Yori, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/355,457

(22) Filed: Feb. 15, 2006

(65) Prior Publication Data

US 2006/0193076 A1    Aug. 31, 2006

(30) Foreign Application Priority Data

Feb. 28, 2005    (JP)    ............................. 2005-052472

(51) Int. Cl.
*G11B 21/02*    (2006.01)
(52) U.S. Cl. ............................. 36/75; 360/25; 360/48
(58) Field of Classification Search .................... None
See application file for complete search history.

(56) References Cited

U.S. PATENT DOCUMENTS 6,490,691 B1 *  12/2002  Kimura et al. .................. 714/8

FOREIGN PATENT DOCUMENTS

| JP | 10-003603 | 1/1998 |
| JP | 11-066709 | 3/1999 |
| JP | 2000-293946 | 10/2000 |

* cited by examiner

*Primary Examiner*—K. Wong
(74) *Attorney, Agent, or Firm*—Townsend and Townsend and Crew LLP; Duke Amaniampong

(57) ABSTRACT

Embodiments of the invention prevent or alleviate head damage ascribable to the TA-causing sections (projections) of disks (TA is thermal asperity). With respect to a TA-causing section that has been detected during initial defect registration, X±A tracks in a radial direction and Y±B sectors (or Y±B bytes of space) in a circumferential direction, with the TA-causing section as a center, are registered collectively during primary registration. Following this, secondary registration is conducted to register a region ranging from ±several tens of tracks to several hundreds of tracks present in a radial direction, and all sectors (or all bytes of space) present in a circumferential direction, with a track of the detected TA-causing section as a center. Furthermore, a cylinder of a region equivalent to the same radial positions as those of the secondary registration is registered (as tertiary registration) for all disks, except for the disk where the TA-causing section was detected. If an available data storage capacity of the magnetic disk drive reaches or exceeds a certain rate with respect to an overall capacity of the drive, the tertiary registration and the secondary registration are released and removed from registered TA sections.

20 Claims, 6 Drawing Sheets

Fig. 3

| TA management region | | TA position Head Track Sector | Primary registration "Flag" | Primary registration data Head Track Sector | Secondary registration "Flag" | Secondary registration data Head Track | Tertiary registration "Flag" | Tertiary registration data Cylinder |
|---|---|---|---|---|---|---|---|---|
| No. 1 | TA Flag | | | | | | | |
| No. 2 | TA Flag | | | | | | | |
| ... | ... | ... | ... | ... | ... | ... | ... | ... |

TA registration area 400

| No. | TA Flag | TA position Head Track Sector | Primary registration data Head Track Sector | Secondary registration "Flag" | Tertiary registration "Flag" |
|---|---|---|---|---|---|
| No. 1 | TA Flag | TA position Head Track Sector | Primary registration data Head Track Sector | Secondary registration "Flag" | Tertiary registration "Flag" |
| No. 2 | TA Flag | TA position Head Track Sector | Primary registration data Head Track Sector | Secondary registration "Flag" | Tertiary registration "Flag" |
| ⋮ | ⋮ | ⋮ | ⋮ | ⋮ | ⋮ |

300', 360, 380

Secondary registration area 410

| No. | Secondary registration "Flag" | Registration information Head Track |
|---|---|---|
| No. 1 | Secondary registration "Flag" | Registration information Head Track |
| No. 2 | Secondary registration "Flag" | Registration information Head Track |
| ⋮ | ⋮ | ⋮ |

Tertiary registration area 420

| No. | Tertiary registration "Flag" | Registration information Cylinder |
|---|---|---|
| No. 1 | Tertiary registration "Flag" | Registration information Cylinder |
| No. 2 | Tertiary registration "Flag" | Registration information Cylinder |
| ⋮ | ⋮ | ⋮ |

MAGNETIC DISK DRIVE TO ALLEVIATE DAMAGE FROM THERMAL ASPERITY

CROSS-REFERENCES TO RELATED APPLICATIONS

This application claims priority from Japanese Patent Application No. JP2005-052472, filed Feb. 28, 2005, the entire disclosure of which is incorporated herein by reference.

BACKGROUND OF THE INVENTION

The present invention relates to a magnetic disk drive including a magnetic disk medium that is rotationally driven and a magnetoresistive (MR) head that writes information onto or reads written information from magnetic disk media. More particularly, the invention is concerned with a magnetic disk drive that includes a function for preventing or alleviating trouble with the element section of an MR head due to the occurrence of thermal asperity on a magnetic disk.

The surface of a magnetic disk (hereinafter, may also be referred to simply as the disk) which is a recording medium of a magnetic disk drive is formed of a number of very thin layers stacked on one another from the disk substrate side in order, such as an underlayer, a magnetic layer, a protective layer, and a lubricant layer. The disk surface also has precise planarity to allow an MR head (hereinafter, may also be referred to simply as the head) to fly over the disk stably with a very small vertical clearance and conduct data read/write operations. Even so, projections equivalent to the very small vertical clearance, dents, flaws, or other defects are present on the disk surface.

When the MR head moves past over the projections on the disk, the element section of the head will come into contact with the projections if the height of the projections is greater than the flying height of the element section. At that time, since a relative speed exists between the MR head and the projections, frictional heat occurs and this causes an abrupt increase in the temperature of the MR head, and hence, an increase in the electrical resistance value of the MR element section. The direct-current components of a readout signal move as a result. This phenomenon is referred to as thermal asperity (TA), whereby a reading error will be caused.

In current magnetic disk drives, since the flying height of the head tends to decrease with increases in recording density, the clearance between the head and the disk is becoming narrower. Accordingly, projections of the height that has heretofore not become a problem are detected as TA-causing sections. There also occurs a situation in which, as the flying height of the head decreases, the very small dust and dirt whose presence has hitherto not become a problem get caught between the head and the disk, thus causing TA. For these reasons, it is difficult to prevent TA from occurring. Assembly of such magnetic disks into a drive is usually followed by the adoption of a method in which the disks are formatted, except for defective sections, and then all defective sections are registered in the drive prior to the start of its use under normal conditions in order to prohibit accessing these defective sections.

Patent Document 1 (Japanese Patent Laid-Open No. Hei 10-3603) discloses a method of detecting and registering the defective sections of a disk medium that cause TA. The detection of the defective sections that cause TA is accomplished by detecting changes in the thermal resistance of the MR element section of an MR head. During the registration of the detective sections, the same sectors of several tracks adjacent to these TA-causing sections are registered as defective sectors to prevent the occurrence of a readout error due to subsequent TA.

Patent Document 2 (Japanese Patent Laid-Open No. 2000-293946) describes a method of reducing the size of a defect information list preservation region significantly and allowing a skipping process to be performed within a short time. In this method, cylinders to which the defective tracks that have suffered damage to become defective sections at which normal data writing or reading is impossible belong are registered in a defective-cylinder list beforehand and when an access request is received from a host apparatus, the defective cylinders registered in the defective-cylinder list are skipped and only nondefective cylinders not including defective tracks are used.

BRIEF SUMMARY OF THE INVENTION

The method described in Patent Document 1 is used to prevent the defective sections on the magnetic disk from growing/expanding by, for example, contact with the head and thus making it impossible to read the information existing in the defective sections and in adjacent regions. This method is therefore intended mainly to protect the data on the magnetic disk.

In current magnetic disk drives, it is confirmed that the passage of the MR head over the TA-causing sections (initial TA-causing sections and subsequent TA-causing sections) on the magnetic disk scratches the element section of the head or wears out the ABS protective film of the element section. Such damage to the element- section of the head may cause problems with the head. In a magnetic disk drive with a plurality of heads, when data within the same cylinder is read/written between other heads and disks, MR heads associated with the tracks where TA-causing sections are present move past the TA-causing sections and damage the element sections of the heads.

For the invention described in Patent Document 2, when a track has a defective section that has suffered damage to make proper reading/writing of data impossible, even if a TA-causing section (projection) does not exist, the recording region of the disk will be reduced in size since the cylinder to which that track belongs is registered as a defective cylinder. Also, since only the cylinders to which the defective tracks that have become defective sections belong are registered, if the defect is a projection, contact between the head and the projection cannot be prevented or alleviated.

For these reasons, head damage due to the presence of the TA-causing sections (projections) on disks cannot be prevented using conventional defect-registering methods.

A feature of the present invention is to prevent or alleviate damage to the MR head of a magnetic disk, caused by the passage of the MR head over the TA-causing sections on the magnetic disk.

A magnetic disk drive according to one aspect of the present invention includes a magnetic disk medium, a spindle motor for rotating the magnetic disk medium at a constant speed, a magnetoresistive head using a magnetoresistive element as an element for reading out data from the magnetic disk medium, and a carriage for positioning the magnetoresistive head at a desired track on the magnetic disk medium; wherein the magnetic disk drive further includes a table in which, in specific regions of the magnetic disk medium, several tracks internal/external to thermal asperity (TA) causing sections of the magnetic disk medium, in a radial direction thereof, and several bytes of space or several sectors in front of/at rear of the TA-causing sections, in a circumferential direction of the magnetic disk medium, are first registered as a primary defect region (the registration is referred to as primary registration), and tracks within a range wider than that of the primary registration, and all sectors in a circumferential direction of these tracks are next registered as a secondary defect region (the registration is referred to as secondary registration).

It is desirable that the secondary registration should range from several tens of to several hundreds of tracks. The range of the secondary registration may otherwise be equivalent to a width of the magnetoresistive element of the magnetoresistive head. Alternately, the range of the secondary registration may be equivalent to a width of the magnetoresistive head existing when an angle of yaw is assigned thereto, in the radial direction of the magnetic disk medium. The secondary registration may also include a number of the magnetoresistive head. The above table may have flag information on the above TA-causing sections and on the primary registration and the secondary registration. The above table may have a TA registration area and a secondary registration area, and the TA registration area may further have position information on the TA-causing sections and flag information on the primary registration and the secondary registration.

It is desirable that the primary registration and the secondary registration should also be conducted for subsequent TA-causing sections. Preferably, when the primary registration and the secondary registration are conducted for subsequent TA-causing sections, the two registration processes are conducted after data present in the respective regions has been moved to other regions.

In accordance with another aspect of the present invention, a magnetic disk drive includes a magnetic disk medium, a spindle motor for rotating the magnetic disk medium at a constant speed, a plurality of magnetoresistive heads each using a magnetoresistive element as an element for reading out data from the magnetic disk medium, and a carriage for positioning each of the magnetoresistive heads at a desired track on the magnetic disk medium; wherein the magnetic disk drive further has a table in which, in specific regions of the magnetic disk medium, several tracks internal/external to thermal asperity (TA) causing sections of the magnetic disk medium, in a radial direction thereof, and several bytes of space or several sectors in front of/at rear of the TA-causing sections, in a circumferential direction of the magnetic disk medium, are first registered as a primary defect region (the registration is referred to as primary registration), tracks within a range wider than that of the primary registration, and all sectors in a circumferential direction of these tracks are next registered as a secondary defect region (the registration is referred to as secondary registration), and a cylinder in a region equivalent to the same radial positions as those of the secondary registration is further registered as a tertiary defect region (the registration is referred to as tertiary registration).

Preferably, the above table has flag information on the above TA-causing sections and the primary registration and the secondary registration. The above table may have a TA registration area, a secondary registration area, and a tertiary registration area, and the TA registration area may further have position information on the TA-causing sections and flag information on the primary registration, the secondary registration, and the tertiary registration.

In some embodiments, when an available storage capacity of the magnetic disk medium exceeds a certain rate, whether TA actually occurs at the above TA-causing sections is judged and the tertiary registration and the secondary registration are released from regions in which no TA has come to occur. Preferably, if TA actually occurs in all the above TA-causing sections, the tertiary registration is released from associated regions in order and then the secondary registration is released from associated regions in order. When the available storage capacity of the magnetic disk medium exceeds a certain rate, the tertiary registration may be released from the respective regions in order and then the secondary registration may be released from the respective regions in order.

The present invention makes it possible to prevent or alleviate damage to MR heads.

BRIEF DESCRIPTION OF THE DRAWINGS

FIG. 3 is a diagram showing an example of a table for registering TA-causing sections.

FIG. 4 is a diagram showing another example of a table for registering TA-causing sections.

DETAILED DESCRIPTION OF THE INVENTION

Figure 2:
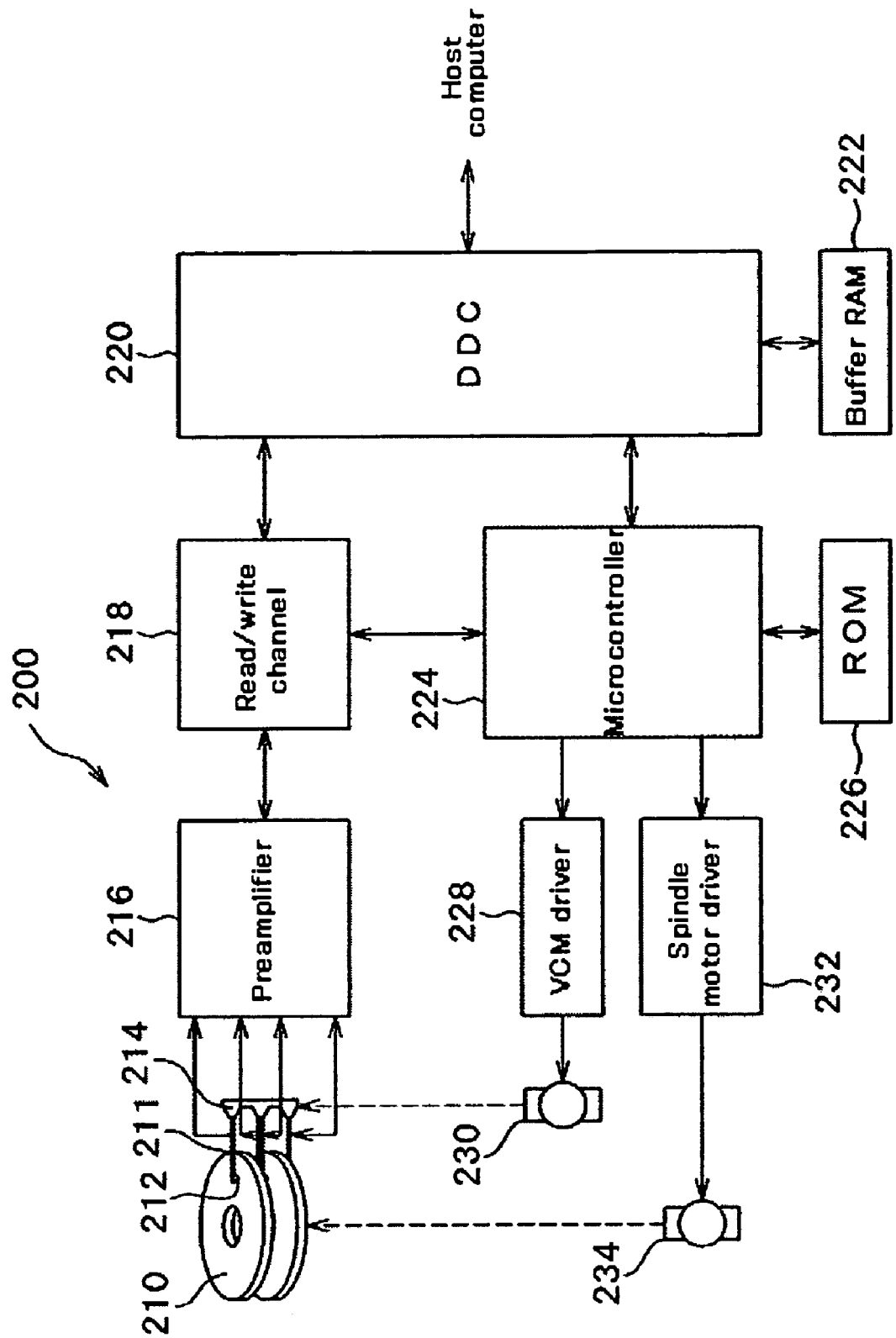
FIG. 2 is a configuration diagram of a magnetic disk drive according to the above embodiment of the present invention.

FIG. 2 is a configuration diagram of a magnetic disk drive 200 according to an embodiment of the present invention. Disks 210 are each rotated by a spindle motor 234, and one MR head 212 is disposed on one associated surface of each disk 210. Each MR head 212 is installed on an associated head arm 211 that extends from a carriage 214 to the disk 210. The carriage 214 has a voice coil motor (VCM) 230 for driving the head arm 211, thus changing a position of the MR head 212, and reading data from specific positions on one or more of the disks 210 or writing data into these specific positions.

A preamplifier 216 amplifies a signal that has been picked up by the MR head 212, and supplies the signal to a read/write channel 218. During write operations, the preamplifier 216 receives encoded write data signals from the read/write channel 218 and sends the signals to the MR head 212. During read operations, the read/write channel 218 detects data pulses from the reading signal supplied from the preamplifier 216, and demodulates the data pulses. The read/write channel 218 sends the demodulated data pulses to a disk data controller (DDC) 220. Furthermore, the read/write channel 218 encodes the write data received from the DDC 220, and supplies the encoded data to the preamplifier 216.

After receiving data from a host computer (not shown), the DDC 220 writes the data onto the disk 210 through the read/write channel 218 and the preamplifier 216. The DDC 220 also transfers reading data that has been received from the disk 210, to the host computer. In addition, the DDC 220 functions as an interface between the host computer and a microcontroller 224. A buffer RAM 222 temporarily saves the data transferred between the DDC 220, the host computer, the microcontroller 224, and the read/write channel 218. The microcontroller 224 controls track-seeking and track-following functions in response to the read and write commands sent from the host computer.

A ROM 226 stores control programs of the microcontroller 224, and various data settings. A VCM driver 228 generates a driving current for the VCM 230 in response to a control signal generated from the microcontroller 224 that controls the position of the MR head 212. This driving current is applied to a voice coil of the VCM 230. The VCM 230 positions the MR head 212 with respect to the disk 210 according to a direction and quantity of driving current supplied from the VCM driver 228. A spindle motor driver 232 drives the spindle motor 234, which then rotates the disk 210 in accordance with a control value generated from the microcontroller 224 that controls the disk 210.

As described earlier herein, during the registration of the initial TA-causing sections that have been detected during the inspection process for magnetic disk drives, X±A tracks present in a radial direction, and Y±B sectors (or Y±B bytes of space) present in a circumferential direction, with a TA-causing section as a center, are registered as defect regions to prevent data from being read from/written into these regions. In this method, however, in a circumferential direction, when a read/write operation is performed in a region other than defect registration regions, the MR head moves past over the TA-causing section and thus comes into contact therewith. Additionally, in a radial direction, since defect registration is usually within a range of about±several tracks, when read/write operations are performed on tracks near the TA-causing section, the vicinity of an element section of the MR head comes into contact with the TA-causing section. For these reasons, contact between the TA-causing section and the MR head element section cannot be prevented using the conventional registering method.

Figure 1:
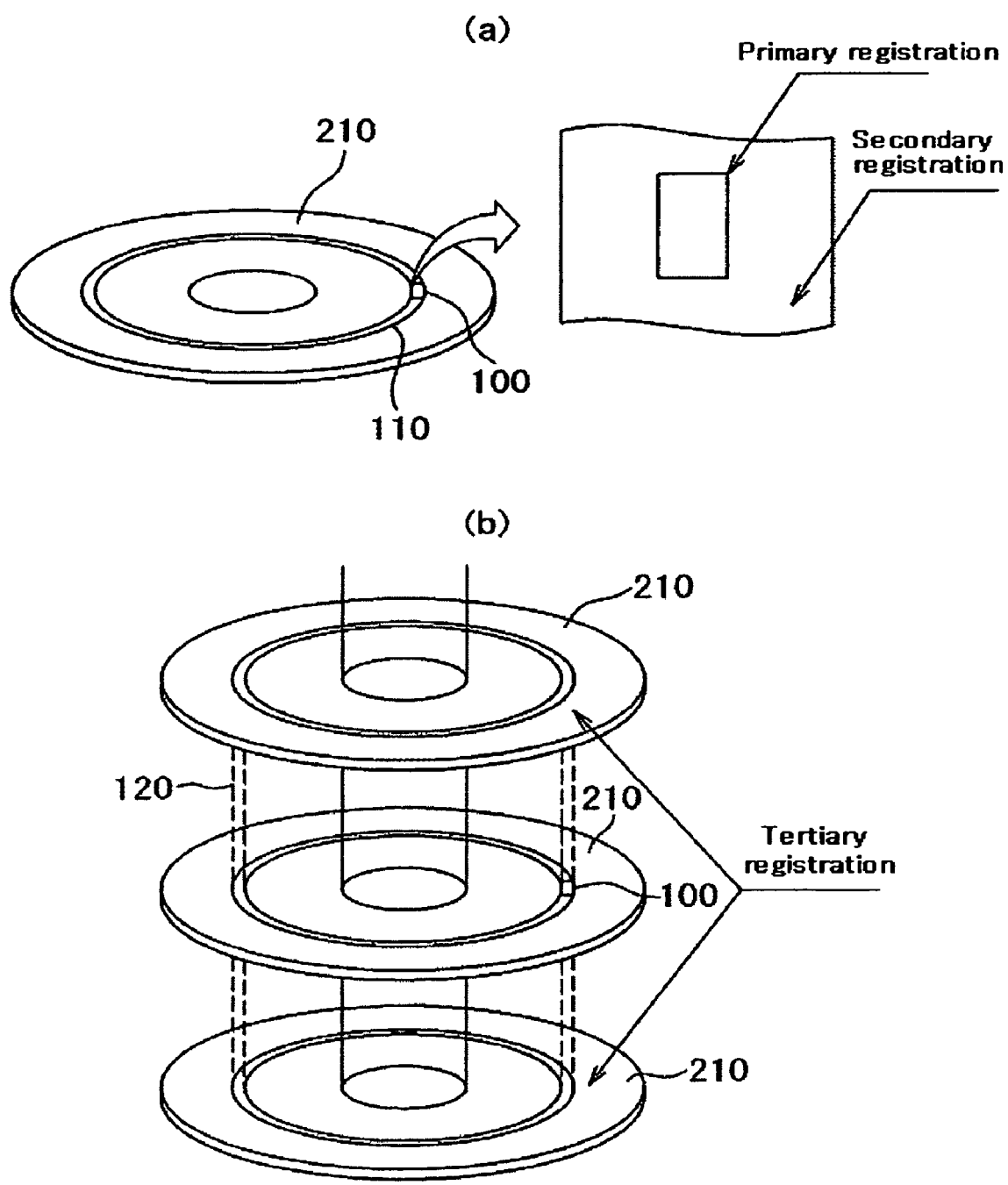
FIG. 1 is a diagram showing a method of registering TA-causing sections according to an embodiment of the present invention.

A method of registering TA-causing sections in the above first embodiment of the present invention is described hereunder. As shown in FIG. 1(*a*), independently of the above-mentioned defect registration (primary registration of the primary defect regions), secondary registration is conducted to register, for a TA-causing section 100 that has been detected during initial defect registration, a region ranging from±several tens of tracks to several hundreds of tracks present in a radial direction, and all sectors (or all bytes of space) present in a circumferential direction. In this case, a track 110 of the detected TA-causing section 100 is taken as a center. Also, it is desirable that a width of the registration in the radial direction be determined considering a width of a magnetoresistive element of the MR head 212 and an angle-of-yaw thereof. The width of the magnetoresistive element means a range from a width of a sensing region to that of a magnetic shield.

Use of this registering method makes it possible to reduce a probability with which the element section of the MR head 212 will move past over the TA-causing section 100, and thus to prevent damage to the element section of the MR head 212. With this method, however, it is not possible to cope with a situation in which a plurality of MR heads 212 are present. That is to say, since regions equivalent to TA-causing sections 100 are not registered for reading/writing with other heads/disks, the MR heads 212 move past over the TA-causing sections 100. As shown in FIG. 1(*b*), therefore, a cylinder 120 of a region equivalent to the same radial positions as those of the secondary registration is registered as a tertiary defect region (tertiary registration) for all disks 210, except for the disk where a TA-causing section has been detected. Using this method makes it possible to alleviate contact between the TA-causing section 100 and the element section of the MR head 212, even in a magnetic disk drive with a plurality of heads/disks.

The methods described heretofore are applied to initial defects (TA-causing sections), and the TA-causing sections may get dust and dirt caught between the disk and the head during operation of the magnetic disk drive 200 or permit the initial defects to grow. If these secondary events actually occur, the TA-causing sections may cause further TA as subsequent TA-causing sections. Preventive or corrective measures are also required in such a case. If the magnetic disk drive internally has such TA detection function as described in Patent Document 1 (Japanese Patent Laid-Open No. Hei 10-3603) or in Japanese Patent Laid-Open No. 2003-123204, it is desirable that the above-described registering method be used for the regions subsequently judged to be TA-causing sections. In this case, data present in new regions are to be moved to other regions before the secondary registration and the tertiary registration are conducted.

Examples of tables 300 and 300' both for registering TA-causing sections 100 are described below with reference to FIGS. 3 and 4. The tables 300 and 300' are stored into specific regions of the magnetic disk 210. FIG. 3 shows an example in which the table 300 constituted essentially by a TA "Flag" 320, a TA position 330, a primary registration "Flag" 340, primary registration data 350, a secondary registration "Flag" 360, secondary registration data 370, a tertiary registration "Flag" 380, and tertiary registration data 390, is created per field in a TA management region 310 of the magnetic disk 210. When a flag is to be set up, "1" is recorded in each "Flag" region. The TA position 330 and the primary registration data 350 both include a head number, a track number 110, and a sector number (see FIG. 1(*a*). The secondary registration data 370 also includes the head number and the track number 110. The tertiary registration data 390 includes a cylinder number 120 (see FIG. 1(*b*). FIG. 4 shows an example of the table 300' in which the TA management region 310 of the magnetic disk 210 is divided into a TA registration area 400, a secondary registration area 410, and a tertiary registration area 420, with the TA registration area 400 having the secondary registration "Flag" 360 and the tertiary registration "Flag" 380.

When the magnetic disk drive 200 is started up, contents of the above table 300 or 300' are read from the magnetic disk 210 and then stored into an internal memory of the microcontroller 224. Since chances of the M head 212 moving past over a tertiary-registered cylinder 120 can thus be reduced significantly, this, in turn, makes it possible to prevent or alleviate damage to the head ascribable to the TA-causing section 100, and hence to prevent decreases in output of the head, and head noise, due to head damage.

Further, when the foregoing method is executed, an overall capacity of the magnetic disk 210 will be reduced. If a lack of capacity becomes a problem, the regions that were registered as TA-causing sections 100 can be partly released. This is because, although the above-described method of registering TA-causing sections prevents head damage by reducing a probability with which the element section of the MR head 212 will move past over a TA-causing section 100, this registering method is a way of coping with head damage, based on the fact that unless the registered sections are the ultimate ends of a data zone on the magnetic disk 210, it is not possible to avoid the passage of the MR head 212 over a TA-causing section 100. That is to say, if the magnetic disk drive 200 is used for such a long time that the drive itself lacks the available storage capacity, it is most likely that the TA-causing section (projection) 100 will have its top abraded by contact with the MR head 212 and will no longer be a TA-causing section 100 or that even if the TA-causing section 100 and the MR head 212 come into contact, the head will not be easily damaged. Therefore, even when the MR head moves past over the first TA-causing section that it encounters after partial release of the registered regions, a risk of head damage will be lower than when the head moves past over an initial TA-causing section.

Figure 5:
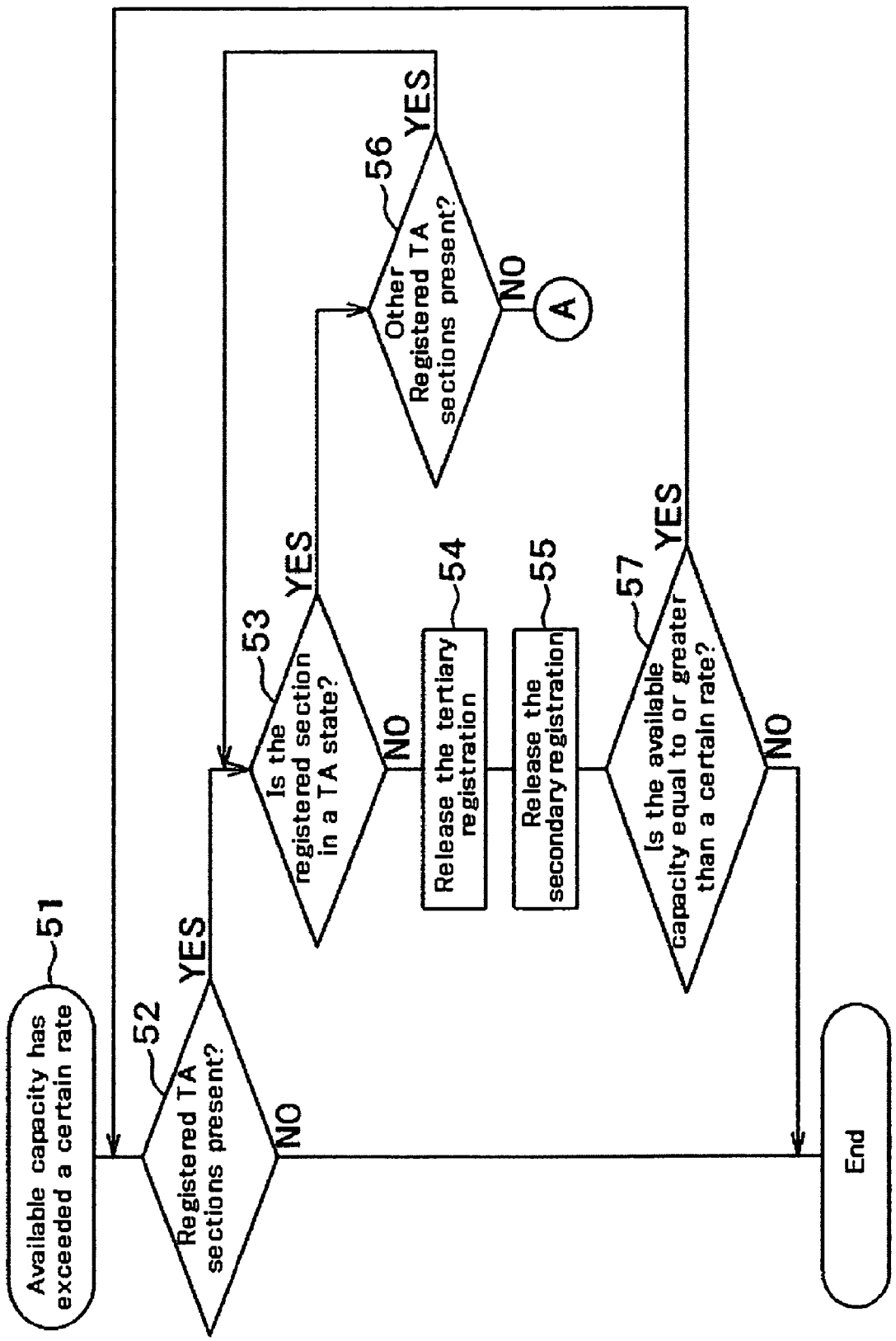
FIG. 5 is a flowchart of the TA registration region release process conducted when a TA detection function is present in the above magnetic disk drive.

A flowchart of the registered-section release process conducted when a TA detection function exists in the magnetic disk drive is shown in FIG. 5. This process is conducted by the DDC 220 or microcontroller 224 of the magnetic disk drive 200. If it is judged in step 51 that an available data storage capacity of the magnetic disk drive has exceeded a certain rate with respect to its overall capacity, the TA "Flag" 320 in the table 300 or 300' is referred to and the presence/absence of a registered TA section is judged in step 52. When a registered TA section is present, whether the particular section is in a TA state is judged in step 53. If the registered TA section is no longer a TA-causing section, the tertiary registration "Flag" and secondary registration "Flag" of that section are searched for and when a flag is set up, the tertiary registration and the secondary registration are released and removed from the registered TA sections in steps 54, 55. If, in step 53, the registered TA section is judged to be in a TA state, judgments are further conducted in step 56 to scan for other registered TA sections. If other registered TA sections are present, a judgment as to whether the particular section is in a TA state is repeated for each detected section. After this, steps 54, 55 are performed once again and then it is judged in step 57 whether the available data storage capacity has reached or exceeded a certain rate with respect to the overall capacity. The process is completed when the available data storage capacity decreases below a certain rate. If the available data storage capacity is equal to or greater than a certain rate, the process is restarted from step 52. The process is completed when all registered TA sections are cleared. The process moves to flowchart A of FIG. 6 if the registered TA sections remaining uncleared in step 56 are all judged to be in a TA state.

Figure 6:
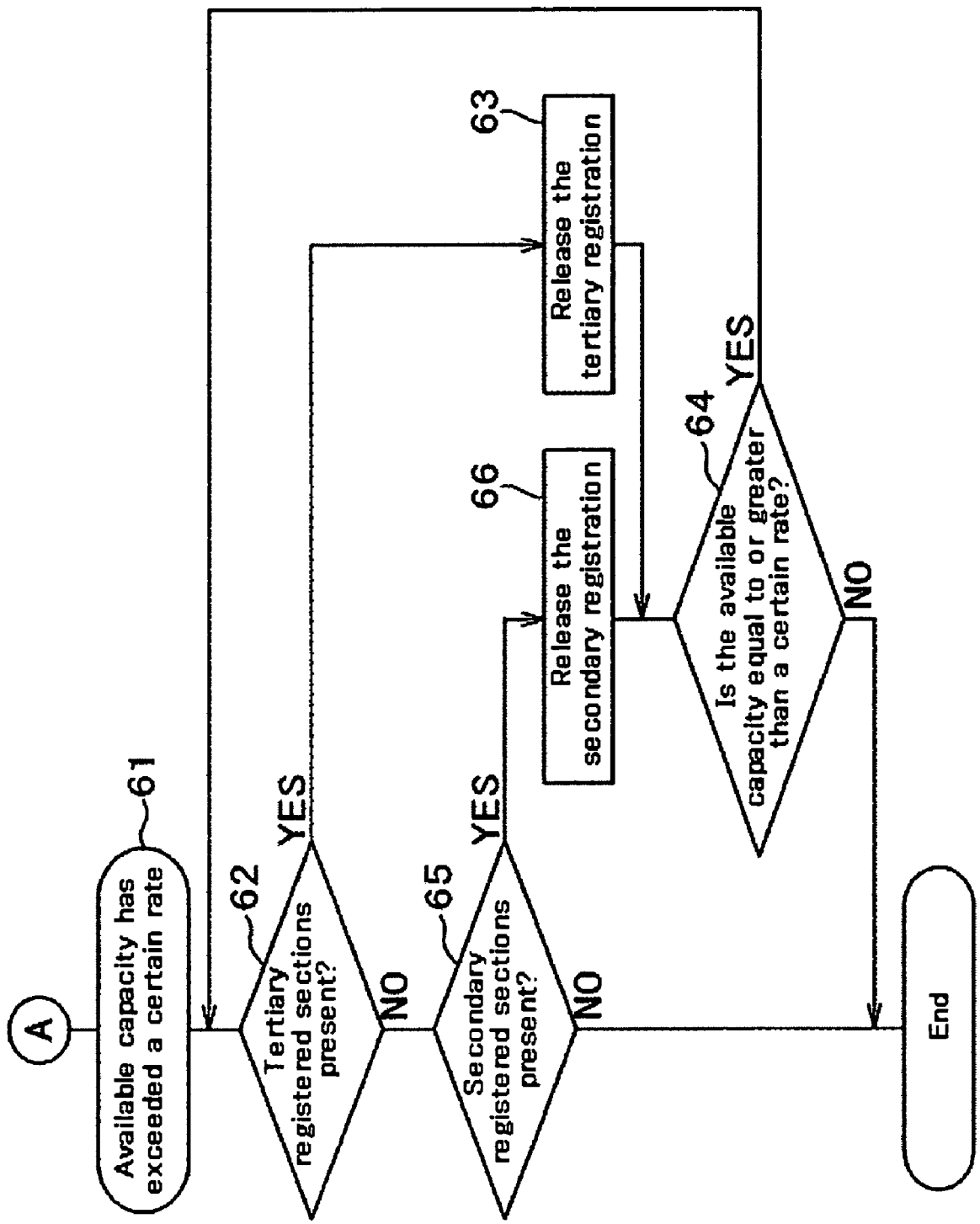
FIG. 6 is a flowchart of the TA registration region release process conducted when all registered TA sections are judged to be in a TA state or when a TA detection function is absent.

FIG. 6 is a diagram that shows flowchart A, and this process is applied when all registered TA sections in step 56 shown in FIG. 5 are judged to be in a TA state or when a TA detection function is not provided in the magnetic disk drive. If it is judged in step 61 that the available data storage capacity of the magnetic disk drive has exceeded a certain rate with respect to its overall capacity, the table is searched in step 62 to scan for tertiary-registered sections in TA registration data fields. If a tertiary-registered section exists, its region is first released in step 63. After a tertiary registration region of one TA registration data field has been released, it is judged in step 64 whether the available data storage capacity has reached or exceeded a certain rate with respect to the overall capacity. If the available data storage capacity is equal to or greater than a certain rate, the process returns to step 62. The process is completed if the available data storage capacity is less than a certain rate. If, in step 62, all tertiary registration regions of the TA registration data field are judged to have been released, the table is searched in step 65 to scan for secondary-registered sections. If secondary-registered sections exist, one secondary registration region is released in step 66 and then it is judged in step 64 whether the available data storage capacity has reached or exceeded a certain rate with respect to the overall capacity. If the available data storage capacity is equal to or greater than a certain rate, the process returns to step 62. The process is completed if the available data storage capacity is less than a certain rate.

A method in which, although tertiary registration regions are to be released, secondary registration regions are not to be released, is also deemed available to ensure even higher reliability. Furthermore, it is also deemed possible to adopt a method in which a tertiary registration range and a secondary registration range are to be specified stepwise and specified regions are also to be released stepwise.

According to the above-described embodiment of the present invention, it is possible to prevent or alleviate problems with the element section of the head due to contact with a TA-causing section. The same can also be realized without reducing the capacity of the magnetic disk drive significantly.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
a magnetic disk medium;
a spindle motor for rotating said magnetic disk medium at a constant speed;
a magnetoresistive head using a magnetoresistive element as an element for reading out data from said magnetic disk medium; and
a carriage configured to position said magnetoresistive head at a desired track on said magnetic disk medium;
wherein said magnetic disk drive further includes a table in which, in specific regions of said magnetic disk medium, several tracks internal/external to thermal asperity (TA) causing sections of said magnetic disk medium, in a radial direction thereof, and several bytes of space or several sectors in front of and at rear of the TA-causing sections, in a circumferential direction of said magnetic disk medium, are registered collectively as a primary defect region (primary registration), and then, tracks within a range wider than a range of the primary registration, and all sectors in a circumferential direction of the tracks, are registered collectively as a secondary defect region (secondary registration).

2. The magnetic disk drive according to claim 1, wherein the secondary registration ranges from several tens of tracks to several hundreds of tracks.

3. The magnetic disk drive according to claim 1, wherein a range of the secondary registration is equivalent to a width of the magnetoresistive element of said magnetoresistive head.

4. The magnetic disk drive according to claim 1, wherein a range of the secondary registration is equivalent to a width that said magnetoresistive head includes in the radial direction of said magnetic disk medium when an angle of yaw is assigned to said head.

5. The magnetic disk drive according to claim 1, wherein the secondary registration includes an identification number of said magnetoresistive head.

6. The magnetic disk drive according to claim 1, wherein said table includes flag information on the TA-causing sections, the primary registration, and the secondary registration each.

7. The magnetic disk drive according to claim 1, wherein said table includes a TA registration area and a secondary registration area, the TA registration area further including position information on the TA-causing sections and flag information on the primary registration and on the secondary registration.

8. The magnetic disk drive according to claim 1, wherein the primary registration and the secondary registration are also performed on subsequent TA-causing sections.

9. The magnetic disk drive according to claim 8, wherein the primary registration and the secondary registration are performed on the subsequent TA-causing sections after data of associated regions has been moved to other regions.

10. A magnetic disk drive comprising:
a magnetic disk medium;
a spindle motor for rotating said magnetic disk medium at a constant speed;
a plurality of magnetoresistive heads each using a magnetoresistive element as an element for reading out data from said magnetic disk medium; and
a carriage configured to position each of said magnetoresistive heads at a desired track on said magnetic disk medium;
wherein said magnetic disk drive further includes a table in which, in specific regions of said magnetic disk medium, several tracks internal/external to thermal asperity (TA) causing sections of said magnetic disk medium, in a radial direction thereof, and several bytes of space or several sectors in front of and at rear of the TA-causing sections, in a circumferential direction of said magnetic disk medium, are registered collectively as a primary defect region (primary registration), then thereafter, tracks within a range wider than a range of the primary registration, and all sectors in a circumferential direction of the tracks are registered collectively as a secondary defect region (secondary registration), and a cylinder in a region equivalent to the same radial positions as radial positions of the secondary registration is further registered as a tertiary defect region (tertiary registration).

11. The magnetic disk drive according to claim 10, wherein said table includes flag information on the TA-causing sections, the primary registration, the secondary registration, and the tertiary registration each.

12. The magnetic disk drive according to claim 10, wherein said table includes a TA registration area, a secondary registration area, and a tertiary registration area, the TA registration area further including position information on the TA-causing sections and flag information on the primary registration, on the secondary registration, and on the tertiary registration.

13. The magnetic disk drive according to claim 10, wherein, when an available storage capacity of said magnetic disk medium exceeds a preset rate, it is judged whether TA actually occurs at the TA-causing sections, and the tertiary registration and the secondary registration are released from regions in which no TA has come to occur.

14. The magnetic disk drive according to claim 13, wherein, if TA actually occurs in all the TA-causing sections, the tertiary registration is released from associated regions in order and the secondary registration is released from associated regions in order.

15. The magnetic disk drive according to claim 10, wherein, when an available storage capacity of said magnetic disk medium exceeds a preset rate, the tertiary registration is released from associated regions in order and the secondary registration is released from associated regions in order.

16. The magnetic disk drive according to claim 10, wherein, when an available storage capacity of said magnetic disk medium exceeds a preset rate, the tertiary registration is released from associated regions in order.

17. The magnetic disk drive according to claim 16, wherein, when tertiary registration has been released from all associated regions, the secondary registration is released from associated regions in order.

18. The magnetic disk drive according to claim 16, wherein the secondary registration is not released from associated regions.

19. The magnetic disk drive according to claim 10, wherein the secondary registration has a stepwise secondary registration range and is configured to be released stepwise.

20. The magnetic disk drive according to claim 10, wherein the tertiary registration has a stepwise tertiary registration range and is configured to be released stepwise.

* * * * *